D. F. COMSTOCK.
LIGHT DIVIDING MEANS FOR OPTICAL APPARATUS.
APPLICATION FILED OCT. 5, 1915.
1,231,710.   Patented July 3, 1917.
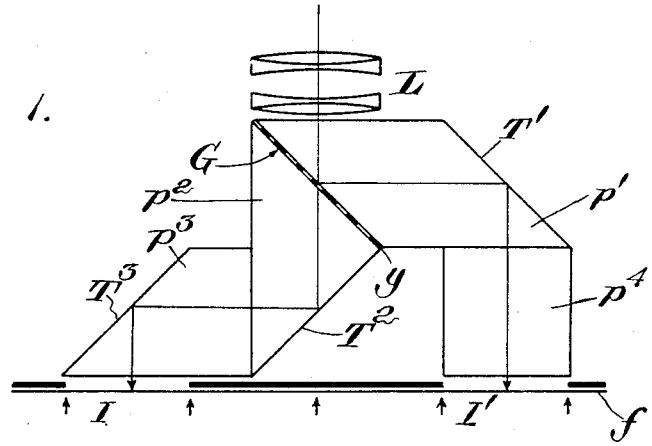
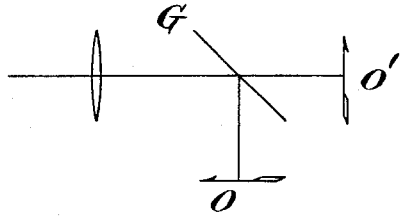
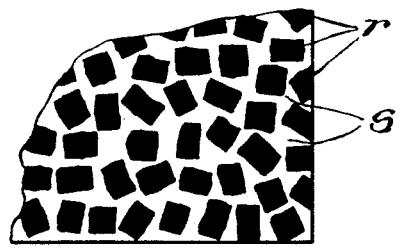
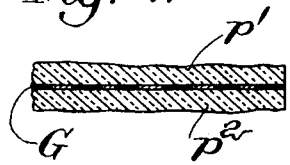
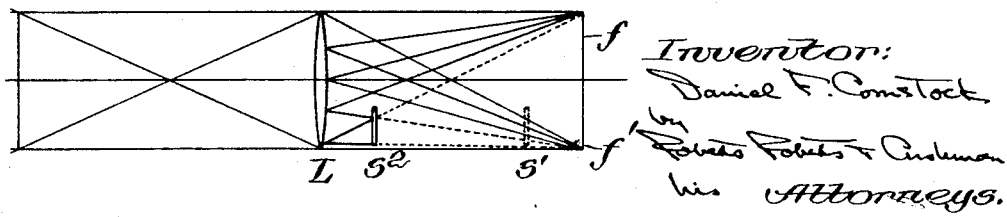
Inventor:
Daniel F. Comstock
by Roberts, Roberts & Cushman
his Attorneys.

UNITED STATES PATENT OFFICE.

DANIEL F. COMSTOCK, OF BROOKLINE, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE.

LIGHT-DIVIDING MEANS FOR OPTICAL APPARATUS.

1,231,710.  Specification of Letters Patent.  Patented July 3, 1917.

Application filed October 5, 1915. Serial No. 54,270.

*To all whom it may concern:*

Be it known that I, DANIEL F. COMSTOCK, a citizen of the United States, and resident of Brookline, in the county of Norfolk and State of Massachusetts, have invented new and useful Improvements in Light-Dividing Means for Optical Apparatus, of which the following is a specification.

My invention relates to a new instrument capable of many optical uses, some only of which will be described, by means of which a predetermined quantitative part of a beam of light may be deflected to a different path without impressing upon the deflected light or the remaining undeflected light any characteristic or quality or disturbance of practical magnitude due to the deflecting means.

Those familiar with optical apparatus are aware of the old laboratory uses for so called half-silvered or half-platinized surfaces, a glass or other optical surface having deposited upon it a coating of metal so thin as both to transmit and to reflect incident light. The making of such surfaces is well known to be difficult and uncertain, especially with regard to the control of the relation of the quantity of reflected and of transmitted light. To produce a mirror of such a kind having any definite or predetermined relation of reflecting to transmitting power usually involves a long course of trial and error. When the best result is secured, a large part of the incident light is found to be neither regularly reflected nor transmitted, being lost by absorption or geometrical scattering at the coated surface. The transmitted beam invariably betrays characteristics different from the reflected beam, such as a distinctive color, or the presence of scattered field light if the reflector is in a beam of directed or image-bearing rays, as between a lens and the image formed by it.

One object of my invention is to provide an instrument, surface or medium, hereinafter termed for convenience of reference only a grid, capable of use in directed light, as between a lens and an object or between a lens and the image of an object whereby a predetermined portion of the image-forming light may be diverted to another path without geometrical distortion and without scattering or the production of effects of interference or diffraction in either part of the divided light of a magnitude or quantity sufficient to disturb the formed image to a noticeable extent. Other objects are to provide an instrument of this nature capable of use in an image forming optical train whereby a plurality of images may be formed by the same lens or concave mirror, each image having the same characteristics under high magnification; or, conversely, capable of use between such an image-forming train and its objects, whereby superposed images may be formed. Other objects are to provide such a mirror or grid capable of splitting an image-bearing beam of light into equally intense and undistorted parts, whereby two or more images originated along the same optical axis may be separately produced. Other objects are to provide means for reducing interference and diffraction of transmitted and reflected beams of light between an image-forming train and two or more images derived therefrom, as well as to render constant, and if desired equal, the relation of the two images with respect to luminous intensity, distribution of intensity, dimensions, and color.

In the accompanying drawings,

Figure 1 is a schematic diagram of an optical train arranged for photography, including my new device;

Fig. 2 illustrates my device in use for observing superposed images;

Fig. 3 is a greatly enlarged fragmentary face view of the grid;

Fig. 4 is a typical section through the grid;

Fig. 5 is a series of diagrams explanatory of certain interference phenomena referred to below; and Fig. 6 is a diagram illustrative of the image region of a lens.

My invention can best be explained in detail by reference to the qualities necessary in certain named uses, in which it may form an element of the combination. In Fig. 1, for instance, I have illustrated schematically a photographic lens L and a sensitive film $f$ upon which it is proposed to form simultaneously at separated points like images of the object field of the lens L. Such an arrangement has important uses in connection with motion pictures, enabling the simultaneous projection through different optical trains of two pictures taken from the same point of view, for instance for automatically colored pictures. A prime consideration is some means of dividing the image-bearing light between lens L and film f into parts which shall be exactly alike in luminous intensity, color, and purity of the image, as well as in dimension. Between the lens and the film, then, optical devices providing two equal or like paths to different points on the film, at similar distances and angles through similar media as measured in the path of the beam from the optical center of the lens, are required. These devices must obscure no part of the field of the lens viewed from the film more than any other part. One image must present no diffraction fringes or interference figures not found on the other, and in practice, both must be free from such effects visible under the high magnification used when projecting the positive pictures. Field light must be avoided or kept at a low quantitative figure, and the total of the light, already from conditions of time at a value which can not be materially reduced, must be kept undiminished.

If now behind the lens, prisms $p'$ $p^2$ having total reflection surfaces $T'$, $T^2$ are arranged to have meeting faces in a plane $g$ inclined at 45° to the optical axis of the lens, and a prism $p^3$ having a total reflection surface $T^3$ adjoins prism $p^2$, and a parallel-faced block $p^4$ is provided behind surface $T'$, the image beam from lens L will have optically equal paths from any point in plane $g$ to symmetrically placed points I, I' on the film $f$ with respect to the optical axis of lens L. If plane $g$ is now occupied by light-dividing means having the property of reflecting half the light through prism $p'$ and transmitting half through prism $p^2$, the system is complete.

Half-silvering or half-platinizing one of the surfaces in plane $g$ has been found to be inadequate by reason of the qualities mentioned above. I have met all of the stated conditions by providing at the plane $g$ a grid G characterized by unobstructed transmission areas or patches of a size separately perceptible to unaided vision, but so small as to occur in a relatively large number in the area of the grid normally included in the optical path and by a reflection area or areas occupying the remainder of the field, the reflecting area A in total bearing a relation to the transmission area R which may be stated as $R = \frac{A}{K}$, where K is a constant expressing the numerical relation between the amount of light incident and the amount reflected at 45° by a continuous reflecting surface of the same kind as the reflecting areas. But the relationship of area may for practical purposes vary considerably without serious results.

The form and distribution of the reflecting areas is important to the result.

Referring now to Figs. 3 and 4, one of the surfaces at the desired point, for instance of prism $p'$, is provided with a dense bright deposit $s$, preferably of silver (if desired of platinum or other white metal) by any known means, for instance by the Brashear or Rochelle salts precipitating methods, or by other electrical or chemical means.

This deposit is either removed or prevented from being formed, by any practicable means, at parts of the surface $r$ amounting altogether to slightly less than half the area. How much less than half may be determined by measuring the reflecting power of the surface $s$, or of a like surface, and removing or preventing the deposit at parts having in sum an area diminished in proportion to the loss of incident light at reflection.

Preferably, I determine in advance the transmission area R which is the sum of the areas $r$ and reflection area A, which is the remainder of the total area, and prepare by hand or photography a negative, templet or pattern having opaque and transparent portions of the respective areas, and then form on the plane surface of the prism or other optical flat an impression of the negative or templet in a medium resisting the metallic deposit at the desired location of the areas $r$, and then deposit the silver. The resistant medium may be any colloid such as gelatin or albumin, and may or may not be reinforced by a grease or a pigment; and in some cases I may employ a medium distributed on the surface mechanically by a printing operation. I prefer to coat the surface with a bichromated colloid, expose to light under the negative or templet, ink with a resistant ink, and develop to remove the vestiges of the unexposed colloid in any desired manner, and then coat with the metal, thereafter removing the hardened colloid in an aqueous bath containing a caustic alkali, leaving the adherent metal. But I may prepare a continuous deposit, and remove the areas $r$ by etching or mechanically. It is within my invention to form the reflecting and the transmission areas in any practicable manner, and it will be understood without further description that I may in some cases rely upon a total-reflection surface, such as the emergent plane of a glass prism, which has been locally treated at the transmission areas only to prevent reflection as by an adherent transparent coating having a relatively high index of refraction, thus establishing at said transmission areas only a free path into another prism or piece of glass for rays totally reflected at the untreated surface.

Referring now to Fig. 5, diagram I illustrates (negatively, for clearness) the appearance of the image on a plane, of a line, such as a vertical slit, viewed through a narrow vertical opening, which we may assume to be used as one of the components $r$ of the grid G. The central appearance or image $x$ in the direct line of vision is broadened inversely as a function of wave-length of the light and the width of the opening nearest the eye by the divergence of the wave-front emergent at the opening, the image exhibiting at its edges the color of the longer wave lengths. On either side of the central image dark and bright bands at regular angular spaces occur, due to interference of the derived wave-fronts propagated at the opening $r$, the longer wave-lengths again appearing at the greater angles from the axis. Narrowing the opening increases both the width of these diffraction bands or spectra, including the band $x$, and the angles of the spectra of the different orders $a$, $a'$, $b$, $b'$, etc.

If the object viewed is a bright point, and if the opening $r$ is a round hole, the diffraction fringes are concentric with the widened bright image. As before, the width of the bright image and the angular separation from the bright image of the interference bands is inversely dependent on the size of the hole $r$. If now the bright point is focused through a lens and viewed through a slit, instead of a hole, the appearance III results.

If instead of a slit, the opening nearer the eye is a grid or series of parallel slits, the phenomenon is rendered more intense by adding together the diffraction spectra of the same or different orders resulting from coincident derived waves propagated at each opening at the respective angles from the axis of the incident light.

It will now be plain that a grid of parallel lines of reflection and transmission will present in both the reflected and transmitted rays bands of diffraction spectra displaced in a direction perpendicular to the lines of the grid, and accompanying the image of every bright point or line of the object field.

If now the reflecting field of the parallel-lined grid be intersected by a series of transmission openings at an angle to the parallel lines, a second series of diffraction spectra results in both beams. If a curved figure of reflection line and transmission opening be employed, curved spectra result. If a series of round openings be employed, the recurrent like edges of each series of circles in every direction add together for a summation of spectra, and complex and extraordinary diffraction light appears at parts of the image field which should be dark for a true image. Any regular pattern of reflection and transmission opening presents a diffraction result dependent on the pattern, which obeys in general the law that the amount of extraneous and displaced light is dependent upon the number of recurrent similarly placed or parallel edges, and is an inverse function of the width of the transmission spaces in the direct beam, and of the reflection spaces in the reflected beam. The amount of light diffracted away from the direct path will thus depend upon the number of openings in the grid, increasing as they increase, and the distribution of this lost light will depend upon the geometrical distribution of the edges between the transmission and reflection spaces.

For such photographic purposes as that suggested and for the generality of uses contemplated for my new instrument, a diffraction figure of a slight extent at the direct beam is of no damage, lying within the definition losses from errors of the lens surfaces or from the effect of halation or creeping in the sensitive coat of the film. I am therefore at liberty to select for the grid an opening or reflecting spot or bar through or from which the widening by diffraction in the direct image is equal to or less than the existent error of definition. I am also at liberty to scatter over the field a certain small proportion of the light not exceeding the field illumination from the lighted surfaces of the lens and other causes always present in cameras. But systematic diffraction figures or fringes at any substantial angles of deviation must be avoided.

Since it is proposed to occupy the image field of the lens with the grid used, the units of transmission and of reflection must not exceed a certain proportion of the angular aperture of the lens when viewed from any point in the film. Inspection of Fig. 6 will make this evident. If an obstruction $s'$ be placed as shown in dotted lines, the point $f'$ in the film $f$ can receive no light from a great part of the aperture of lens L. If this obstruction be moved toward the lens, less of the source of illumination of any point of the film is obscured, and the shadow of the same obstruction at $s^2$, for instance, is so ill defined at $f'$ that its effect is perceptible only as a general loss of illumination at the lower part of the film. If now there are a number of evenly distributed obstacles $s^2$, near the lens, the loss of light is not local but general, and there is no local shadow in the transmitted light. The reflectors $s$ of the grid G are such obstacles, and their permitted size is that at which they become separately noticeable as shadows at the film $f$. When I hereinafter refer to a grid or light-dividing means having a relatively great number of reflection and transmission areas, I thereby refer to the frequency of occurrence of said areas in respect to the aperture or width of field of the optical path through the said grid, the number and dimensions of the respective areas being such as to avoid the formation of separately discernible shadows by any element of the grid in the image or virtual image or images formed by or observed through the apparatus in which it may be employed. One practicable size for a grid having the described qualities employed with a lens of 2¼ inches principal focus and 1 inch aperture averages sixteen openings to the linear inch. In the reflected beam, the behavior of the light from the reflectors is inversely the same; as they increase in size or approach the film, the illumination from any one of them becomes more local and less general.

I have succeeded in reducing the diffraction effect to a minimum by the expedient illustrated, for one instance only, in Fig. 3. The transmission openings $r$ shown are irregular four-sided figures, preferably varying in size, having straight or irregularly curved sides, scattered at random on the field, of which the remainder is the reflection area $s$, capable of relatively complete reflection, but it will be understood that irregular three-sided or polygonal figures oriented at random will give the same effect of reducing the probability of any systematically recurring series of openings to a negligible quantity. I have failed to discover any system of diffraction bands or spots from such a surface, the effect of which is illustrated at IV, Fig. 5, when the direct image of the lens alone is that represented at II. Instead of the concentric series of diffraction rings surrounding the artificial-star image (greatly magnified) shown at II, the grid G reflects or transmits an image surrounded by a photographically equivalent halo $h$, having a complex structure, and occupying about the same area as the rings of the direct image. In both cases the quantity of the definition loss is about the same, and within or very near the limit of definition from the other causes explained above.

While I have described the reflecting coat $s$ as the remainder from the spots or holes $r$, it is evident that the grid G may be made up of reflecting spots $r$ and a transmission remainder $s$. I prefer the opposite arrangement shown for a metallic reflecting surface, since it can be in the main continuous and be so much the better retained during making.

Such a grid as I have described will usually be inclosed in a body of a dense optical medium, convenience dictating its formation on one face of a prism which can have a plane surface normal to the incident light. As shown in Figs. 1 and 4, such a prism $p'$ will be accompanied by another $p^2$ to which the transmitted light should pass without substantial reflection losses, and I usually cement the two prisms together at the grid with an optical cement C such as Canada balsam, of as near the optical qualities as the glass of the prisms as possible, and in any case of an optical density greater than the atmosphere. In Fig. 2 I have illustrated another employment for the grid G merely to suggest many other obvious uses. A lens L′ may be employed behind such a grid as an objective through which to view the objects $o$ and $o'$ superposed upon each other. One object may be a scale and the other an object to be measured. Obviously my device is also of use in range-finders, surveying instruments, goniometers and the like to enable superposition of images of the same thing through angle-measuring trains for a delicate determination of a zero angle, and many other uses will occur to those skilled in the art.

What I claim is:

1. Light dividing means comprising a relatively great number of distinct areas of transmission and of relatively complete reflection having joint boundaries arranged to reduce interference and diffraction of the reflected and transmitted light in every direction.

2. Light dividing means comprising a surface having thereat areas of transmission and areas of relatively complete reflection whose meeting edges lie in a plurality of different distinct directions.

3. Light dividing means comprising a surface having distributed thereon areas of transmission, said areas each having boundaries lying at various angles with respect to other boundaries of the said area.

4. Light dividing means comprising a surface having distributed thereon areas of relatively complete reflection, said areas each having boundaries lying at various angles with respect to other boundaries of the said area.

5. Light dividing means comprising a surface having thereat a plurality of reflecting and transmitting areas differing in size and unevenly recurrent throughout said surface in every direction thereof.

6. Light dividing means comprising a surface having distributed thereupon variously spaced areas varying in dimensions relatively to one another, the spaces between said areas differing from said areas with respect to transmitting or reflecting light incident upon said surface.

7. A grid for dividing incident light into portions having different directions comprising transmission areas and reflection areas coextensive as a whole but the parts of which are distinct from each other, the boundaries between, of adjacent areas lying at random both in direction and distance from other boundaries between other parts of said areas.

8. A grid for dividing incident light into beams of predetermined relative intensity characterized by a relatively large number of relatively small reflection and transmission areas having joint boundaries distributed to avoid cumulative diffraction spectra in any direction due to the grid.

9. A grid for dividing incident light comprising a relatively large number of polygonal transmission areas arranged to avoid interference fringes in the transmitted light of a greater intensity than the fringes due to a single area of the same size and form.

10. A grid for dividing incident light comprising reflection areas conjoint with a relatively large number of transmission areas shaped and positioned to avoid interference fringes in the reflected light of a greater intensity than the fringes of single area.

11. A grid, comprising an optical flat surface treated at a relatively large number of its parts only to cause transmission of incident light, the remainder of the parts of the surface being capable of reflection, the arrangement being such that an alternation of said parts is intersected by a line drawn on the surface of said flat in any direction.

12. A grid comprising an optical flat having a succession of areas, spots or surfaces alternating in capacity for transmission and reflection in every direction, the dimensions of the areas, spots or surfaces being irregular or various when measured in any direction.

13. A grid comprising a transparent body having an optical surface having an opaque reflecting adherent coating interrupted by unevenly recurrent polygonal openings, and a transparent body adjacent to said surface united thereto by a substance having a higher optical density than the atmosphere.

14. A grid for optical uses having polygonal reflection and transmission areas of a perceptible size irregularly arranged with respect to each other.

15. A grid for optical uses having reflection and transmission areas of a perceptible size irregularly arranged thereon, the reflecting areas being in sum greater than the sum of the transmission areas, whereby light of substantially equal intensity may be reflected and transmitted by said grid.

16. A grid for optical uses comprising a reflecting surface having irregularly oriented polygonal transparent portions therein.

17. A grid for optical uses comprising a transparent body having a surface, of which irregularly distributed parts bear an adherent body causing selective reflection and transmission as between the parts adhering and not adhering to said adherent body with respect to light emergent from said transparent body whereby light directed to a focus beyond the emergent face of said body is substantially free of diffraction spectra due to said interrupted surfaces.

18. In an optical apparatus, means for dividing an image-bearing beam of light comprising means for reflection and means for transmission of respective parts of the light at different angles, said means being mutually arranged to avoid cumulative diffraction spectra in any direction in either part of the divided light.

19. In an optical apparatus, a grid comprising prisms having adjacent plane faces separated by a reflecting foraminated grid in which the foraminations are irregularly placed and oriented at random, the foraminations being filled by a transparent mass in contact with the adjacent faces of both prisms.

Signed by me at Boston, Massachusetts, this thirtieth day of September, 1915.

DANIEL F. COMSTOCK.

Witnesses:
CHARLES D. WOODBERRY,
ROBERT CUSHMAN.

Copies of this patent may be obtained for five cents each, by addressing the "Commissioner of Patents, Washington, D. C."